United States Patent Office 3,485,651
Patented Dec. 23, 1969

3,485,651
WATER-SOLUBLE CELLULOSE ETHER OR
STARCH COMPOSITIONS
Alexander J. Ganz, Wilmington, Del., assignor to Hercules Incorporated, Wilmington, Del., a corporation of Delaware
No Drawing. Filed Dec. 18, 1967, Ser. No. 691,248
Int. Cl. C08h 17/42; C08b 21/00
U.S. Cl. 106—179
10 Claims

ABSTRACT OF THE DISCLOSURE

A composition quickly dispersible in and rapidly dissolvable by compatible aqueous medium, and comprising a substantial quantity of normally slowly water-dispersible and dissolvable, water-soluble, finely divided, substantially dry gum is made by (a) dispersing the gum in a water-miscible, relatively inert, substantially dry liquid carrier that has substantially no swelling effect on and substantially no solvating effect for said gum, and (b) admixing with the resulting dispersion a quantity of water sufficient to substantially increase the rates of dispersion and solution of said gum in water, but insufficient to substantially dissolve said gum. In preferred embodiments, the liquid carrier contains in solution one or more salts selected from the group consisting of substantially dry, water-soluble salts of alkali metals and alkaline earth metals, and surfactant selected from the group consisting of substantially dry, water-soluble nonionic and cationic surfactants. Moreover, in preferred embodiments the liquid carrier has sufficient consistency and/or density to retard settlement of said gum material. This is achieved in some of these embodiments by incorporating into the liquid carrier substantially dry, water-soluble and carrier-soluble suspending agent.

---

This invention resides in the chemical arts. It relates generally to both synthetic and naturally occurring water-soluble gums and, more particularly, to ways and means for effecting quick dispersion and rapid solution of such gums in aqueous media.

Gums, as the term is used herein, refers to plant polysaccharides and their derivatives, and like synthetic substances, which are dispersible in either hot or cold water to produce viscous mixtures or solutions.

The purpose of this paragraph is to explain the use herein and in the prior art of the terms "degree of substitution" ("D.S.") and "M.S." There are three hydroxyl groups in each anhydroglucose unit in the cellulose molecule. D.S. is the average number of hydroxyl groups substituted in the cellulose per anhydroglucose unit. M.S. is the average number of moles of reactant combined with the cellulose per anhydroglucose unit. For the alkyl, carboxyalkyl, or acyl derivatives of cellulose, the D.S. and M.S. are the same. For the hydroxyalkyl derivatives of cellulose, the M.S. is generally greater than the D.S. The reason for this is that each time a hydroxyalkyl group is introduced into the cellulose molecule, an additional hydroxyl group is formed which itself is capable of hydroxyalkylation. As a result of this, side chains of considerable length may form on the cellulose molecule. The M.S./D.S. ratio represents the average length of these side chains. Thus, from the foregoing it will be seen that the D.S. of a cellulose derivative can be no higher than 3, whereas the M.S. may be considerably higher than 3, depending on the extent to which side chains are formed.

A problem of long standing has been to obtain quick dispersion and rapid solution of water-soluble gums such as, for example, sodium carboxymethylcellulose (CMC) upon admixture with compatible aqueous media, that is, aqueous media that do not change the gums into water-insoluble substances. As is well known, when particles of these gums are added at a practical rate to water, there is a great tendency of the gum particles to form lumps comprising a dry core surrounded by a sheath or shell of hydrated gum. These lumps dissolve very slowly. Formation of these lumps can be minimized by very vigorous stirring, by adding the gum particles to water very slowly, by increasing the particle size of the gum particles (but generally the larger the particle size the slower the rate of dissolution), by coating the gum particles with material such as monoglyceride, which material is dissolved only slowly by water, by dry blending the gum particles with particles of dry nonpolymeric material such as sugar, and by numerous other methods known in the art, all of which have substantial disadvantages.

One such method to inhibit the formation of lumps comprises dispersing the gum particles in a water-miscible liquid in which the gum particles are insoluble and do not swell. A disadvantage here is that it still is necessary sometimes to employ extremely vigorous agitation to avoid formation of lumps. Another disadvantage is that even when lumps do not form, the solubility rate is not fast enough for some operations such as high temperature short time pasteurization. Still another disadvantage, particularly in the case of CMC propylene glycol, is that the CMC particles settle on standing and pack together to form a compact mass which is hard to redisperse by stirring and shaking. Yet, the gum dispersion method has advantages in other respects.

Consequently, a general object of this invention is to provide an improved gum dispersion method.

A specific object of this invention is to provide a gum dispersion that avoids one or more of these disadvantages.

These and other objects are achieved by this invention which, in summary, provides a composition comprising a water-soluble gum normally slowly dispersible in and dissolvable by water, which composition, however, is quickly dispersible in and rapidly dissolvable by aqueous media. In addition to the gum, the composition consists essentially of a substantially dry, water-miscible liquid carrier, and a small quantity of water.

"Substantially dry" as used herein means that the free water concentration of the substance referred to is at most about 10% by weight of the substance.

This invention is applicable to a single gum or to a mixture of two or more gums. The water-soluble gum is generally normally solid, that is, solid at 20–25° C. Said gum is finely divided, generally being finer than 30 mesh, U.S. screen size, and preferably finer than 100 mesh, U.S. screen size. However, smaller mesh sizes are within the broader concepts of this invention. Said gum is substantially dry. The gum can be of natural origin or it can be synthetic. Examples of a normally solid, water-soluble gum include water-soluble cellulose ethers and their alkali metal salts such as, for instance, alkyl cellulose ethers such as, for instance, methyl cellulose, and the like, hydroxyalkyl cellulose ethers such as, for instance, hydroxyethyl cellulose, hydroxypropyl cellulose, and the like, and alkali metal and carboxyalkyl and carboxyalkyl hydroxyalkyl cellulose ethers such as, for instance, sodium carboxymethycellulose, sodium carboxymethyl hydroxyethyl cellulose and the like, and alkyl hydroxyalkyl cellulose ethers such as, for instance, ethyl hydroxyethyl cellulose and the like. Other examples of a water-soluble gum include water-soluble starch derivatives such as, for instance, alkali metal carboxyalkyl starch, hydroxyalkyl starch, oxidized starch and the like, and vegetable gums such as, for instance, algin, guar gum, locust bean gum, gum ghatti, gum karaya, gum tragacanth, gum arabic (or acacia), psyllium seed, and the like.

The water-miscible liquid carrier consists essentially of at least one compound that normally is liquid, is water miscible, is inert relative to the water-soluble gum, and effects substantially no swelling and dissolution of the water-soluble gum. In some embodiments of this invention the water-miscible liquid carrier comprises only one such compound. In other embodiments it comprises a mixture of two or more such compounds. Examples of such compound include monohydric alcohols such as, for instance, methanol, ethanol, propanol, and the like, glycols such as, for instance, ethylene glycol, 1,2-propylene glycol, 1,3-butylene glycol, and the like, and ketones such as, for instance, acetone and the like.

The quantity of water-miscible liquid carrier is such that the gum can be dispersed therein. This means that the quantity is such that the carrier volume is substantially greater than the volume of the gum.

The water in the composition of this invention substantially facilitates the water dispersibility and water dissolution of the gum. The total quantity of water in the composition is substantially more than the quantity of water normally present in the substantially dry water-soluble gum of commerce, plcs that quantity normally present in the substantially dry water-miscible liquid carrier, but less than that amount which results in substantial dissolution of the gum. The total quantity of water that can be present in the composition of this invention is dependent upon the composition of the gum, its concentration and the presence of other components, for instance, water-soluble salts, in the composition. Consequently, it is not practical to set forth general numerical values applicable to all specific embodiments of the composition of this invention. On the other hand, numerical values of added water concentration have been determined for specific embodiments of the composition in which the gum consists of substantially dry CMC products, and these values are tabulated as follows with each concentration value being in percent by weight of the composition:

|  | Concentration of CMC product | General range of added water concentration | Preferred range of added water concentration |
| --- | --- | --- | --- |
| Viscosity type of CMC product: |  |  |  |
| Low | 10 | 1-40 | 10-20 |
| Low and medium | 20 | 1-15 | 10 |
| Do | 30 | 1-13 | 5-10 |
| Do | 40 | 1-8 | 5 |
| Medium | 10 | 1-35 | 10-20 |
| High | 10 | 1-30 | 10-15 |
| Do | 20 | 1-13 | 10 |
| Do | 30 | 1-8 | 5 |
| Do | 40 | 1-5 | 3 |

A low viscosity CMC product is one which, when dissolved at a concentration of 2% by weight in water, gives at 25° C. a viscosity in a range from about 18 to about 50 centipoises as determined with the aid of a Brookfield viscometer. A typical moisture content of the substantially dry commercial products of this viscosity type is generally at most about 8% by weight and, in most instances, at most about 5% by weight and usually about 3-4% by weight. A medium viscosity CMC product is one which, when dissolved at a concentration of 2% by weight in water gives at 25° C. a viscosity in a range from about 50 to about 7100 centipoises as determined with the aid of a Brookfiield viscometer. A typical moisture content of the substantially dry commercial products of the medium viscosity type is generally at most about 8% by weight and, in most instances, at most about 5% by weight and usually about 3-4% by weight. A high viscosity product when dissolved at a concentration of 1% by weight in water at 25° C. gives a viscosity from about 400 to about 4500 centipoises as determined with the aid of a Brookfield viscometer.

Preferred embodiments of the composition of this invention comprise one or more components in addition to those set forth hereinbefore.

One additional component is compatible inorganic salts. These consist of at least one salt that is soluble in water and that is compatible with the water-soluble gum. A salt compatible with the water-soluble gum is one that does not react with the water-soluble gum to form a water-soluble product or to convert the water-soluble gum ino a product soluble in the water-miscible liquid carrier. Examples of a salt having these properties include the alkali metal and alkaline earth metal salts such as, for example, sodium chloride, potassium chloride, calcium chloride, and the like. The suspended finely divided water-soluble gum in the composition of this invention tends to settle out of the water-miscible liquid carrier when the composition is stored under quiescent conditions for long periods of time, and to form a compact mass which is hard to redisperse in the water-miscible liquid carrier. In some instances, instead of the water-soluble gum settling out, the composition turns into a paste which is hard to disperse and dissolve in water. The compatible salt minimizes paste formation and compaction of the water-soluble gum when it settles. The compatible salt, however, generally does not prevent settling of the gum.

Concentration of the compatible salt is generally in a range from about 0.1 to about 10% by weight of the water-miscible liquid carrier, and preferably in a range from about 2 to about 5% by weight of the liquid carrier. However, higher and lower concentrations are within the broader concepts of this invention.

Another additional component is preferred embodiments of the composition of this invention is at least one surfactant, either anionic or nonionic. Preferably, at the concentrations used, the surfactant, is soluble in the liquid carrier and compatible with the gum. A compatible surfactant is one which does not substantially react with the gum to form substances which are insoluble in water or the liquid carrier. Preferred examples of compatible surface-active agents include polyoxyethylene (20) sorbitan monostearate (a polyoxyethylene adduct of sorbitan monostearate in which the oxyethylene content averages 20 mole percent), polyoxyethylene (20) sorbitan monooleate (a polyoxyethylene adduct of sorbitan monooleate having an average oxyethylene content of about 20 mole percent), sodium lauryl sulfate, dioctyl sodium sulfosuccinate, monoglycerides, diglycerides, sodium stearyl fumarate, lecithin, hydroxylated lecithin, fatty acid esters of propylene glycol, polyglycerol esters of fatty acids, and the like. The surfactant material facilitates redispersion of the gum material when it settles in the water-miscible liquid carrier.

Concentration of the surfactant in these preferred embodiments of the composition of this invention is generally in a range from about 0.05 to about 5% by weight of the water-miscible liquid carrier and preferably in a range from about 1 to about 2% by weight of the liquid carrier. However, higher and lower concentrations are within the broader concepts of this invention.

Another component in preferred embodiments of the composition of this invention comprises at least one compatible suspending agent. Even when compatible salt and surfactant are present, the gum tends to settle in the liquid carrier on storage and, when applying mixing action to the composition, does not tend to redisperse as readily as is desirable. However, if the consistency of the water-miscible liquid carrier is increased, and/or the density of the liquid carrier is increased, this undesirable settling out on standing and difficulty in redispersing are minimized. Increase in consistency and/or density of the liquid carrier is achieved by a compatible suspending agent. The suspending agent consists of at least one material substantially soluble in at least the water-miscible liquid carrier at the concentrations involved, which suspending agent does not substantially react with the gum to form substances which are insoluble in water or the liquid carrier. The suspending agent can be a simple compound or it can be a polymer. Examples of typical suspending agents include glycerol, hydroxypropyl cellulose of the kind claimed in U.S. Patent No. 3,278,521 to Eugene D. Klug, starch hydrolysates, polyvinyl pyrrolidone, carboxyvinyl polymers, and the like.

Concentration of the suspending agent depends in general on the increase in consistency and/or density desired, and on the particular suspending agent used. There are substantial differences in the ability of various suspending agents to effect a desired increase in consistence and/or density. For instance, in those embodiments of the composition of this invention, which are based on CMC and propylene glycol, when a hydroxypropyl cellulose such as described hereinafter in connection with Examples 7 and 17 is used, its concentration is generally 0.5%–2% and preferably 1% by weight of the propylene glycol. When glycerol is used to achieve substantially the same effect its concentration is generally 3–10% and preferably 5% by weight of the propylene glycol. When the suspending agent consists of corn starch solids such as described hereinafter in relation to Example 10, to achieve substantially the same effect its concentration is generally 15–40% and preferably 20–35% by weight of the propylene glycol. Hence, in view of the wide variety of suspending agents, it is not practical to specify a general numerical concentration range for the suspending agent. The most that can be stated is that the concentration of the suspending agent is sufficient to substantially minimize settlement of the water-soluble gum when suspended in the liquid carrier.

The compositions (formulations) of this invention are made by admixing the components thereof. In preferred embodiments of this invention a preferred procedure is to admix the water-miscible liquid carrier and suspending agent, admix with vigorous stirring the water and mixture of liquid carrier and suspending agent, and then successively add with continued vigorous stirring the surfactant, water-soluble gum and compatible salt. Variations of this procedure, however, can be employed. The composition can be made at about room temperature or at temperatures above room temperature. The composition can also be passed through a colloid mill, burr mill or the like to obtain as complete a dispersion as possible of the water-soluble gum in the water-miscible liquid carrier.

This invention is further illustrated by the following working examples of various aspects of this invention, including specific embodiments. This invention is not limited to these specific embodiments.

EXAMPLES 1 AND 2

These examples illustrate specific embodiments of the formulations of this invention, which are based on a commercially available low viscosity type CMC.

The formulations of the specific compositions of these examples are as follows:

| Components | Concentration in parts by weight | |
|---|---|---|
|  | Ex. 1 | Ex. 1 |
| CMC (low viscosity type) | 20 | 32 |
| Propylene glycol | 66 | 50 |
| Water | 10 | 16 |
| Sodium chloride | 3 | 0 |
| Polyoxyethylene (20) sorbitan monostearate | 1 | 3 |

In the foregoing formulations, the CMC is finely divided (90–95% by weight being less than 40 mesh U.S. screen size as shipped), has a degree of substitution of 0.65–0.85, and has a moisture content of 3–4% by weight. A 2% by weight aqueous solution thereof at 25° C. typically has a Brookfield viscometer (spindle No. 1 at a spindle speed of 60 revolutions per minute with a multiplication factor of 1) viscosity of 25–50 centipoises. The moisture concentration of the propylene glycol is about 0.08% by weight. The other components, except water, are preferably, but not necessarily, also substantially dry as obtained. However, when any one of them is accompanied by a significant quantity of water, the quantity is considered as part of the water component of the composition.

The compositions of these examples are made by admixing with vigorous stirring the propylene glycol and water, and then with continued vigorous stirring adding in succession the polyoxyethylene (20) sorbitan monostearate, the CMC and the sodium chloride.

The specific compositions thus obtained are suspensions which, upon addition to water with stirring, quickly disperse and rapidly dissolve. If the suspension is stored under quiescent conditions, the CMC particles settle out, but are readily resuspended upon agitation, and upon addition to water quickly disperse and rapidly dissolve.

The compositions of Examples 1 and 2 have utility as laundry size agents and as ice cream stabilizers.

EXAMPLES 3–10

These examples illustrate specific embodiments of a composition of this invention, which are based on a commercially available medium viscosity type CMC.

The formulations of the specific compositions of these examples are as follows:

| Components | Concentration in parts by weight | | | | | | | |
|---|---|---|---|---|---|---|---|---|
|  | Ex. 3 | Ex. 4 | Ex. 5 | Ex. 6 | Ex. 7 | Ex. 8 | Ex. 9 | Ex. 10 |
| CMC (medium viscosity type) | 20 | 20 | 20 | 30 | 20 | 10 | 20 | 2 |
| Propylene glycol | 70 | 67 | 66 | 56 | 66 | 66 | 65.3 | 44.5 |
| Water | 10 | 10 | 10 | 10 | 10 | 20 | 10 | 10 |
| Sodium chloride |  | 3 | 3 | 3 | 3 | 3 | 3 | 3 |
| Polyoxyethylene (20) sorbitan monooleate |  |  | 1 |  |  |  |  |  |
| Polyoxyethylene (20) sorbitan monostearate |  |  |  |  | 1 | 1 | 1 | 1 |
| Hydroxypropyl cellulose |  |  |  |  |  |  | 0.7 |  |
| Starch hydrolysate |  |  |  |  |  |  |  | 21.5 |

In the foregoing formulations, the medium viscosity type CMC as shipped is finely divided (at least 80% being less than 200 mesh, U.S. screen size), has a degree of substitution of 0.80–0.95, and has a moisture content of 3–4% by weight. A 2% aqueous solution thereof at 25° C. gives a Brookfield viscometer viscosity (spindle No. 2 at a spindle speed of 60 revolutions per minute with a multiplication factor of 5) of 800–3100 centipoises. The propylene glycol has a moisture content of about 0.8% by weight. All other components, except the water, are preferably, but not necessarily, also substantially dry as obtained. However, when any one of them is accompanied by a significant quantity of water, this quantity is considered a part of the water component of the composition. The hydroxypropyl cellulose employed in the compositions of these examples has an M.S. of about 4, is soluble in cold water, insoluble in hot water, and soluble in polar organic solvents, and is thermoplastic. A 1% by weight aqueous solution of it at 25° C. gives a Brookfield viscometer (spindle No. 3 at a spindle speed of 30 revolutions per minute with a multiplication factor of 40) viscosity of 1500–2500 centipoises. The starch hydrolysate, marketed as Frodex 42, consists essentially of corn syrup solids having a dextrose equivalent of 42, and a moisture content less than about 10%.

The specific compositions of these examples are made by the same procedure described in Examples 1–2, except that in the case of Examples 9 and 10, before admixing of the propylene glycol and water, the hydroxypropyl cellulose in Example 9 is first dissolved in the propylene glycol, and in Example 10 the starch hydrolysate is first dissolved in the propylene glycol.

The product thus obtained in each example is a suspension which, upon admixture with water, quickly disperses and rapidly dissolves. When each product is stored under quiescent conditions, the suspended particles of CMC do tend to settle with the greatest settlement occurring typically in the products of Examples 3–8. Typically the settled material in Example 3 forms a compact mass which is most difficult to redisperse in the propylene glycol and under some circumstances may become paste-like. Typically the settled solids in the product of Example 4 are in a loose mass, but it is rather hard to redisperse the settled solids. On the other hand, the settled solids in the products of Examples 5–10 are readily redispersed in the propylene glycol and upon addition of these products to water quickly disperse and rapidly dissolve in the water.

The products of Examples 3–9 have utility as laundry size agents and, along with the product of Example 10, have utility as ice cream stabilizers.

EXAMPLES 11–18

These examples illustrate specific embodiments of formulations of this invention which are based on a commercially available high viscosity type CMC.

The formulations of these embodiments are as follows:

plastic, and a 1% aqueous solution thereof at 25° C. gives a Brookfield viscometer (spindle No. 3 at a spindle speed of 30 revolutions per minute with a multiplication factor of 40) viscosity of 1300–2200 centipoises.

The formulations of each of these examples are prepared substantially by the same procedure as in Examples 1–2, except as follows in Examples 12, 13, 17 and 18. In Examples 12 and 13 the distilled monoglycerides product in each case is admixed with the propylene glycol while heating the mixture to about 60° C. and stirring until the monoglycerides product is dissolved, and then the CMC is added and the mixture stirred for about 15 minutes. Thereafter, the sodium chloride is added and the water is slowly streamed into the mixture. The resulting product is stirred until it has cooled down to 20–25° C. In Examples 17 and 18, the hydroxypropyl cellulose of Example 17 and the glycerine of Example 18 are first dissolved in the propylene glycol before it is admixed with the water.

The formulation thus obtained in each example is a fluid suspension which when added to water quickly disperses and dissolves. When the formulations are stored under quiescent conditions, minimal settlement of the suspended solids occurs in the case of the formulations of Examples 17 and 18 while settlement is greatest in the case of the formulations of Examples 11–16. The settled solids in Example 11 tend to form a compact mass which is extremely difficult to redisperse and in some instances can even become pastelike. The formulation of Example 11, therefore, should be used within a short period of time after it has been made. The settled solids in the formulations of Examples 12–18, however, can be readily dispersed and, upon addition of the respective products to water, quickly disperse and rapidly dissolve therein. On the other hand, the formulation of Example 18 has a disadvantage in that upon prolonged storage under quiescent conditions, the viscosity of the composition tends to gradually increase and eventually the formulation tends to become pastelike and dissolve in water only with difficulty. Hence, the formulation of Examples

| Components | Concentration in parts by weight | | | | | | | |
|---|---|---|---|---|---|---|---|---|
| | Ex. 11 | Ex. 12 | Ex. 13 | Ex. 14 | Ex. 15 | Ex. 16 | Ex. 17 | Ex. 18 |
| CMC (high viscosity type) | 20 | 15 | 15 | 20 | 20 | 20 | 20 | 20 |
| Propylene glycol | 70 | 69 | 72 | 67 | 66 | 66 | 65.3 | 61 |
| Water | 10 | 10 | 10 | 10 | 10 | 10 | 10 | 10 |
| Sodium chloride | | 5 | 2 | 3 | 3 | 3 | 3 | 3 |
| Distilled monoglycerides product from prime lard | | 1 | 1 | | | | | |
| Dioctyl sodium sulfosuccinate | | | | 0.1 | | | | |
| Polyoxyethylene (20) sorbitan monooleate | | | | | 1 | | | |
| Polyoxyethylene (20) sorbitan monostearate | | | | | | 1 | 1 | 1 |
| Hydroxypropyl cellulose | | | | | | | 0.7 | |
| Glycerine | | | | | | | | 5 |

In the foregoing formulations, the high viscosity type CMC as shipped is finely divided (at least 80% being less than 200 mesh U.S. screen size), has a degree of substitution of 0.65–0.85, and has a moisture content of 3–4% by weight. A 1% aqueous solution thereof at 25° C. gives a Brookfield viscometer (spindle No. 3 at a spindle speed of 30 revolutions per minute with a multiplication factor of 40) viscosity of 1300–2200 centipoises. The propylene glycol has a moisture content of about 0.8% by weight. The other components, except water, are preferably, but not necessarily, also substantially dry as obtained. However, when any of them is accompanied by a significant quantity of water, the quantity is considered as part of the water component of the composition. The distilled monoglycerides product from prime lard has a monoglycerides content of at least about 90% by weight of the product with the fatty acid moieties and their relative proportions substantially the same as in prime lard. The hydroxypropyl cellulose is characterized by an M.S. of about 4, by being soluble in cold water, insoluble in hot water, and soluble in polar organic solvents, and by being thermo- 12–17 are the most preferable of the formulations of Examples 11–18.

The formulations of these examples have utility as laundry size agents and as ice cream stabilizers.

Actual comparative testing has demonstrated the superior water dispersibility and dissolvability of the composition of this invention. Three test procedures were involved. These procedures are as follows:

Test procedure 1

Into an 8-ounce wide mouthed jar are placed 175 grams of water at 20–25° C. 25–50 grams of a sample of the composition to be tested are rapidly added to the jar, and the jar is capped and shaken vigorously by hand. The presence or absence of lumps of water-soluble gum material is observed after 5 or 10 shakes.

Test procedure 2

Into a glass jar 12 inches in diameter and 12 inches high are placed 13 liters of water. An Extralon stirrer, size B, is inserted to a depth of 6 inches in the water and rotated at 500 revolutions per minute. 100 grams of a sample of the composition to be tested are added within 15 seconds to the water. The initial turbidity of the mixture, caused by the water-soluble gum not being dissolved, is rated as 100. Stirring is continued and at intervals of 2, 5 and 8 minutes the mixture is observed for turbidity, lumps, and other indications, if any, of incomplete solution. A completely dissolved sample is rated 0.

In another test series Test procedure 3 was employed on samples, the formulations of which are set forth in the following Table II. The components were substantially the same as described in Examples 3–10. The samples were made to the extent applicable by the same procedure described in Examples 3–10. The formulation of the samples, concentrations being given in parts by weight, and test data are set forth in the following Table II.

TABLE II.—COMPONENTS OF TEST SAMPLES, PARTS BY WT.

| Sample No.: | CMC, Med. Viscosity type | Propylene glycol | Water | Sodium chloride | Polyoxyethylene (20) sorbitan monostearate | Test Procedure No. 3 | | | Remarks |
|---|---|---|---|---|---|---|---|---|---|
| | | | | | | 2 Min. | 5 Min. | 8 Min. | |
| 1 | 20 | 76 | | 3 | 1 | 70 | 2 | 0 | At 2 minutes sample was well dispersed with "lots of fisheyes". |
| 2 | 20 | 66 | 10 | 3 | 1 | 40 | 0 | | At 2 minutes sample was well dispersed with "few fisheyes". |

Test procedure 3

The procedure of Test procedure No. 2 is followed, except that 13 liters of a 50% by weight aqueous sugar solution is placed into the glass jar instead of the 13 liters of water.

In one test series the water-soluble gum material consisted of the medium viscosity type CMC described in Examples 3–10. Other components involved in the test samples were substantially the same as described in Examples 3–10. All components of the compositions to be tested, except for the water component, were substantially dry. The samples were made to the extent applicable by the procedure of Examples 3–10. The formulations of the samples to be tested, the concentrations being in parts by weight, and the test data obtained are set forth in the following Table I.

Sample 2, it will be seen, corresponds in formulation to the composition of Example 5. The data of Table II demonstrate the outstanding water dispersibility and dissolution of the composition of this invention.

In another series of tests the CMC-containing formulations set forth in the following Table III were made to the extent applicable by the procedure of Examples 3–10. An ice cream mix having the following formulation:

Components: Concentration in parts percent by weight
Butter fat _____ 10
Nonfat milk solids _____ 12
Sucrose _____ 15
Water _____ 63 was prepared, pasteurized at 70° C. for 30 minutes,

TABLE I

| Sample No. | Components of test samples, parts by weight | | | | | | | | | Test Procedure No. 2 | | |
|---|---|---|---|---|---|---|---|---|---|---|---|---|
| | CMC, Med. viscosity type | Sugar | Propylene glycol | Water | Sodium chloride | Polyoxyethylene (20) sorbitan monostearate | Hydroxypropyl cellulose | Starch hydrolysate | Test Procedure No. 1 | 2 Min. | 5 Min. | 8 Min |
| 1 | 100 | | | | | | | | Lumps very badly | | | |
| 2 | 20 | 80 | | | | | | | do | | | |
| 3 | 10 | 90 | | | | | | | do | | | |
| 4 | 20 | | 80 | | | | | | Lumps remained after 5 shakes | 25 | 5 | 1 |
| 5 | 20 | | 70 | 10 | | | | | Completely dissolved within 5 shakes. | 15 | 1 | Trace |
| 6 | 20 | | 77 | | 3 | | | | Lumps remained after 5 shakes | | | |
| 7 | 20 | | 67 | 10 | 3 | | | | Completely dissolved within 5 shakes. | | | |
| 8 | 20 | | 76 | | 3 | 1 | | | Lumps remained after 5 shakes | | | |
| 9 | 20 | | 66 | 10 | 3 | 1 | | | Completely dissolved within 5 shakes. | | | |
| 10 | 20 | | 79.2 | | | | 0.8 | | Lumps remained after 10 shakes | 60 | 10 | 0 |
| 11 | 20 | | 75.2 | | 3 | 1 | 0.8 | | Lumps remained after 10 shakes, but fewer than 10. | 60 | 10 | 0 |
| 12 | 20 | | 65.3 | 10 | 3 | 1 | 0.7 | | Completely dissolved within 10 shakes. | 45 | 0 | |
| 13 | 20 | | 44.5 | 10 | 3 | 1 | | 21.5 | do | | | |

Samples 5, 7, 9, 12 and 13, it will be observed, correspond in formulation to the specific compositions of Examples 3–5, 9 and 10, respectively. These samples displayed superior water dispersion and dissolution compared to the other samples in this test series.

Comparative testing according to Test procedures 1 and 2 of samples of the specific compositions of the other examples herein has resulted in similar data demonstrating the superior water dispersion and dissolution of the composition of this invention.

homogenized at 2000+500 p.s.i.g., and cooled to 60° C. In each test 1000 grams of the ice cream mix were placed in a 500 ml. beaker and an Extralon stirrer, size B, was inserted and operated at 800 revolutions per minute for 20 minutes. In the case of samples 2–5, the Extralon stirrer was removed and replaced by a propeller type stirrer which was operated at about 1500 revolutions per minute for 5 minutes. A quantity of the formulation, sufficient to give a CMC concentration in the final mix of 0.5% by weight thereof was added and the viscosity of the final mix measured at the intervals indicated in Table III. The test data are set forth in Table III.

tration in a range from about 0.05% to about 5% by weight of said liquid carrier, said composition being a

TABLE III

| | Components in Test Samples, Parts by Wt. | | | | | Viscosities in Centipoises | | | | | | |
|---|---|---|---|---|---|---|---|---|---|---|---|---|
| CMC, Med. viscosity type | Sugar | Propylene glycol | Water | Sodium chloride | Polyoxyethylene (20) Sorbitan monostearate | 800 r.p.m. mixing | | | | | | 1,500 r.p.m. mixing |
| | | | | | | 1 minute | 3 minutes | 5 minutes | 10 minutes | 15 minutes | 20 minutes | 25 minutes |
| Sample No.: | | | | | | | | | | | | |
| 1........ 5 | 20 | | | | | ¹30 | ¹125 | | | | | |
| 2........ 20 | | 76 | | 3 | 1 | 250 | 418 | 410 | 398 | 395 | 392 | 360 |
| 3........ 20 | | 76 | | 3 | 1 | 270 | 425 | 420 | 410 | 405 | 400 | 370 |
| 4........ 20 | | 66 | 10 | 3 | 1 | 240 | 370 | 370 | 370 | 370 | 370 | 358 |
| 5........ 20 | | 66 | 10 | 3 | 1 | 280 | 380 | 380 | 375 | 375 | 375 | 365 |

¹ Lumps.

Samples Nos. 4 and 5, it can be observed, correspond in formulation to the specific composition of Example 5. The test data show that attainment of final viscosity in the case of test samples 4 and 5 was virtually complete within three minutes. In the case of sample 1 the CMC lumped so badly that the initial viscosity measurements were very low. In the case of samples 2 and 3, which had the same formulation, the viscosities rose to a peak and then gradually fell without reaching a stable level in 20 minutes, and in fact fell still more when the final mix after 20 minutes of mixing at 800 r.p.m. was subjected to 5 minutes of additional mixing at 1500 r.p.m.

Thus, this invention provides a composition containing water-soluble gum that normally is slowly dispersible in and dissolvable by water, but which composition is quickly dispersible in and rapidly dissolvable by compatible aqueous media.

Other features, advantages and specific embodiments of this invention will be readily apparent to those in the exercise of ordinary skill in the art after reading the foregoing disclosures. Such specific embodiments are within the scope of the claimed subject matter. Also, while specific embodiments of this invention have been described in considerable detail, variations and modifications of these embodiments can be effected without departing from the spirit and scope of the invention as disclosed and claimed.

What I claim and desire to protect by Letters Patent is:

1. A composition quickly dispersible in and rapidly dissolvable by an aqueous medium, which comprises (1) water-soluble gum normally slowly dispersible in and slowly dissolvable by water selected from the group consisting of water-soluble cellulose ethers and starch derivatives, (2) a water-miscible liquid carrier that has substantially no swelling effect on and substantially no dissolving effect for said gum, the volume of said carrier being substantially greater than the volume of said gum, and (3) a quantity of added water within the range of about 1% to about 40% by weight of said composition, the total amount of water present being sufficient to substantially increase the dispersion and dissolution of said gum in said aqueous medium but insufficient to substantially dissolve said gum, said composition being a suspension of said water-soluble gum in a solution of said liquid carrier in said water.

2. A composition according to claim 1, which further comprises an inorganic salt compatible with said water-soluble gum at a concentration in a range from about 0.1% to about 10% by weight of said water-miscible liquid carrier, said composition being a suspension of said water-soluble gum in a solution of said liquid carrier and inorganic salt in said water.

3. A composition according to claim 2 which further comprises a surfactant compatible with said water-soluble gum selected from the group consisting of anionic and nonionic surfactants, said surfactant being at a concentration in a range from about 0.05% to about 5% by weight of said liquid carrier, said composition being a suspension of said water-soluble gum in a solution of said liquid carrier, inorganic salt and surfactant in said water.

4. A composition according to claim 3, which further comprises a suspending agent compatible with said water-soluble gum and soluble in said liquid carrier, the concentration of said suspending agent being sufficient to substantially minimize settling of said gum when suspended in said carrier, said composition being a suspension of said water-soluble gum in a solution of said liquid carrier, inorganic salt, surfactant and suspending agent in said water.

5. A composition according to claim 4, wherein said suspending agent is hydroxypropyl cellulose characterized by having an M.S. of about 4 and by being soluble in cold water, insoluble in hot water, soluble in polar organic solvents, and thermoplastic.

6. A composition according to claim 3, wherein said water-soluble gum is carboxymethylcellulose.

7. A composition according to claim 6, wherein said liquid carrier is propylene glycol.

8. A composition according to claim 7, wherein said inorganic salt is sodium chloride.

9. A composition according to claim 8, wherein said surfactant is polyoxyethylene (20) sorbitan monstearate.

10. A process for effecting quick dispersion in and rapid dissolution by an aqueous medium of normally slowly water dispersible and dissolvable water soluble gum selected from the group consisting of water-soluble cellulose ethers and starch derivatives, which process comprises (1) dispersing said gum in a water-miscible liquid carrier having substantially no swelling effect and substantially no dissolving effect on said gum, the volume of said carrier being substantially greater than the volume of said gum, said carrier containing a quantity of added water within the range of about 1% to about 40% by weight of said composition, the total amount of water present being sufficient to substantially increase the rate of dispersion and dissolution of said gum in said aqueous medium but insufficient to substantially dissolve said gum, whereby a suspension is formed, and (2) thereafter admixing said suspension with said aqueous medium.

References Cited

UNITED STATES PATENTS

| | | | |
|---|---|---|---|
| 2,439,460 | 4/1948 | Engler | 106—208 |
| 2,768,143 | 10/1956 | Henry. | |
| 2,776,904 | 1/1957 | Brown | 106—197 |
| 2,970,063 | 1/1961 | Jordan et al. | 106—208 |

ALLAN LIEBERMAN, Primary Examiner

H. H. FLETCHER, Assistant Examiner

U.S. Cl. X.R.

106—187, 189, 194, 197, 198, 208, 213

UNITED STATES PATENT OFFICE
CERTIFICATE OF CORRECTION

Patent No. 3,485,651                      December 23, 1969

Alexander J. Ganz

It is certified that error appears in the above identified patent and that said Letters Patent are hereby corrected as shown below:

Column 3, line 23, "plcs" should read -- plus --. Column 4, line 13, "water-soluble" should read -- water-insoluble --; line 36, "is" should read -- in --. Column 6, formulation table, the last column should read as shown below:

Ex. 2

30
56
10
3
1 same column 6, in the formulation table, under Examples 3-10, Example 10, line 1, "2" should read -- 20 --.

Signed and sealed this 7th day of July 1970.

(SEAL)
Attest:

EDWARD M. FLETCHER, JR.            WILLIAM E. SCHUYLER, JR.
Attesting Officer                   Commissioner of Patents